United States Patent
Amble et al.

(10) Patent No.: US 6,738,322 B2
(45) Date of Patent: May 18, 2004

(54) OPTICAL DATA STORAGE SYSTEM WITH FOCUS AND TRACKING ERROR CORRECTION

(75) Inventors: James R. Amble, Milpitas, CA (US); Herman A. Ferrier, Scotts Vally, CA (US); LeRoy A. Volz, San Jose, CA (US); Andrew J. Diaber, Palo Alto, CA (US)

(73) Assignee: Research Investment Network, Inc., Irvine, CA (US)

( * ) Notice: Subject to any disclaimer, the term of this patent is extended or adjusted under 35 U.S.C. 154(b) by 0 days.

(21) Appl. No.: 10/109,431

(22) Filed: Mar. 27, 2002

(65) Prior Publication Data

US 2004/0001400 A1 Jan. 1, 2004

Related U.S. Application Data

(63) Continuation of application No. 09/625,521, filed on Jul. 26, 2000, now abandoned.
(60) Provisional application No. 60/146,415, filed on Jul. 29, 1999.

(51) Int. Cl.[7] .................................................. G11B 7/00
(52) U.S. Cl. ................. 369/44.27; 369/44.37; 369/112.01; 369/94
(58) Field of Search ..................... 369/44.11, 44.27, 369/44.28, 44.37, 47.1, 53.23, 93, 94, 103, 275.1, 112.01, 112.15

(56) References Cited

U.S. PATENT DOCUMENTS 6,538,978 B1 * 3/2003 Holtslag et al. ......... 369/275.1

* cited by examiner

Primary Examiner—Muhammad Edun
(74) Attorney, Agent, or Firm—Keiji Masaki; Steve A. Wong; Richard J. Stokey

(57) ABSTRACT

The disclosed device is directed towards an optical data storage system. The optical data storage system comprises an optical medium including a servo plane and at least one data plane. A first laser is positioned to generate a servo laser beam and address the servo plane with a first servo focus spot. A second laser is positioned to generate a read-write laser beam and address the data plane with a second read-write focus spot. A first servo system is associated with the first laser and is configured to provide focus and tracking error correction according to servo information associated with the servo plane. A second servo system is associated with the second laser and is configured to provide focus and tracking error correction according to servo information associated with the data plane.

19 Claims, 18 Drawing Sheets

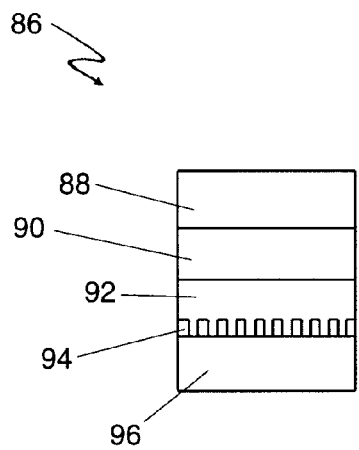
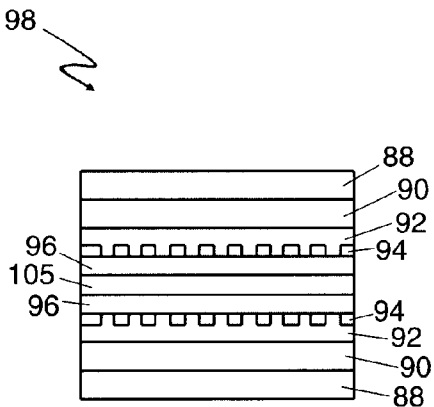
FIG. 3A  FIG. 3B
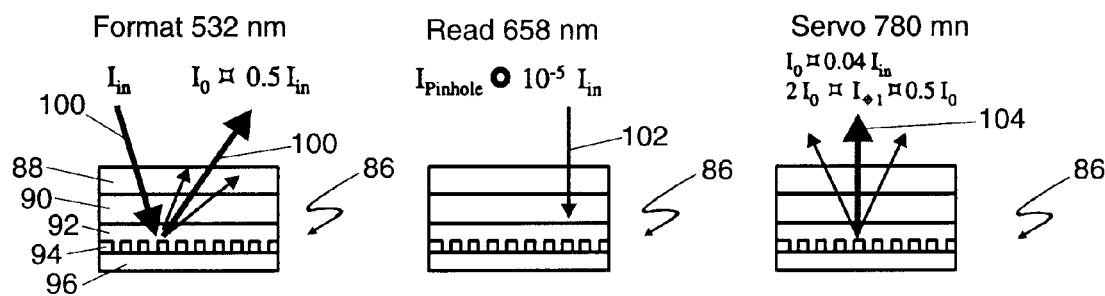
FIG. 3C  FIG. 3D  FIG. 3E

FORMAT 532 nm

READ 658 nm

SERVO 780 nm

FORMAT 532 nm

READ 658 nm

SERVO 780 nm

FORMAT 532 nm

READ 658 nm

SERVO 780 nm

FORMAT 532 nm

READ 658 nm

SERVO 780 nm

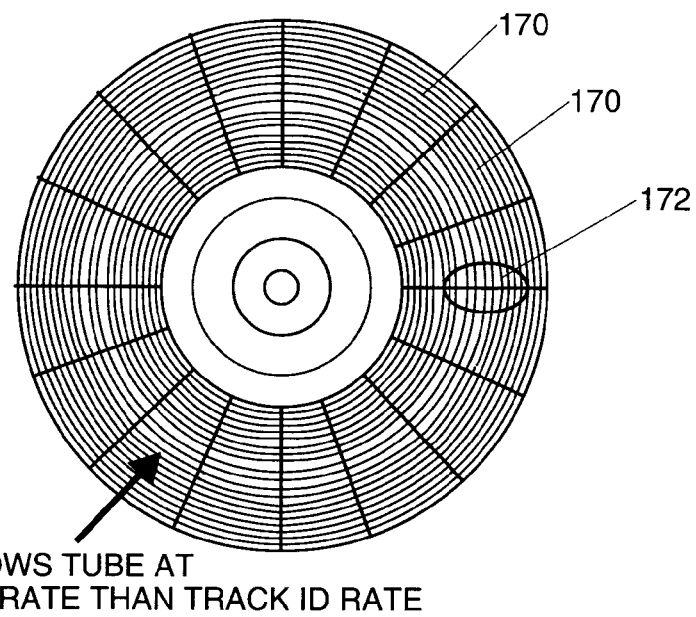
SERVO FOLLOWS TUBE AT
HIGHER SAMPLE RATE THAN TRACK ID RATE
FIG. 9A
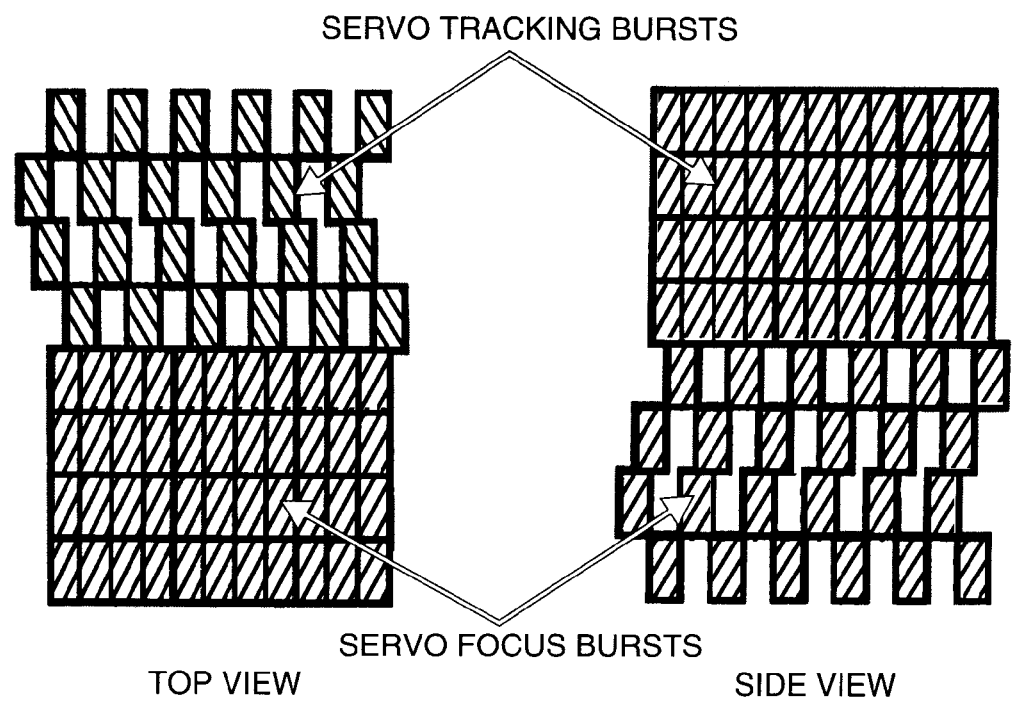
SERVO TRACKING BURSTS
SERVO FOCUS BURSTS
TOP VIEW           SIDE VIEW
FIG. 9B           FIG. 9C

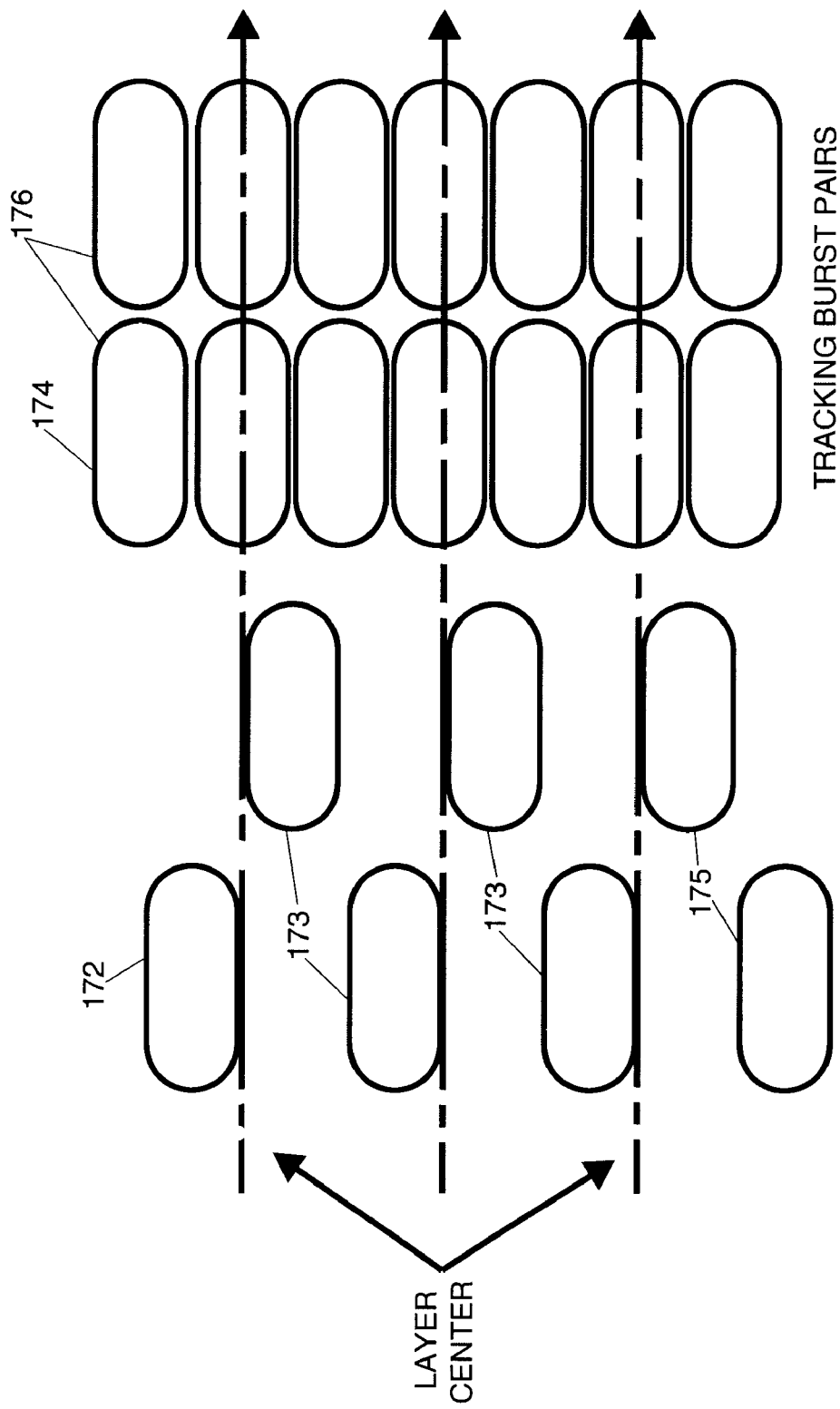

END ON VIEW

SERVO FOLLOWS TUBE AT HIGHER SAMPLE RATE THAN TRACK ID RATE

OPTICAL DATA STORAGE SYSTEM WITH FOCUS AND TRACKING ERROR CORRECTION

CROSS-REFERENCE TO RELATED APPLICATION

This is a continuation of patent application Ser. No. 09/625,521, filed Jul. 26, 2000 now abandoned.

RELATED APPLICATION DATA

This application is entitled to the benefit of U.S. Provisional Patent Application Ser. No. 60/146,415 filed Jul. 29, 1999. This application is related to U.S. patent application Ser. No. 09/549,075 Apr. 15, 2000 U.S. Pat. No. 6,574,174, U.S. patent application Ser. No. 09/016,382 Jan. 30, 1998 U.S. Pat. No. 6,212,148, and U.S. patent application Ser. No. 09/229,457 Jan. 12, 1999 U.S. Pat. No. 6,322,933.

BACKGROUND OF THE INVENTION

1. Field of the Invention

This invention pertains generally to devices and methods for controlling focus and tracking errors during readout of optical media. More particularly, the present invention is an optical focus and tracking servo system which maintains a focused servo spot on a dedicated guide or tracking surface while a focused data read/write spot is tightly coupled to the servo spot at an adjustable offset distance in both the focus and tracking directions. Servo marks are embedded in the recording medium in a format hologram to provide focus and tracking information for positional correction of the read write spot.

2. Description of the Background Art

Optical data storage provides a convenient way to achieve high storage densities in relatively inexpensive media. During recording and readout of optical data, it is important to keep the focus of the read/write beam properly positioned. Various focus and tracking error correction systems have been created in this regard to maintain correct positioning of the read/write beam focus within optical storage media. As increased data storage densities and multiple data storage layers are used in optical media, improved focus and tracking error correction has become necessary. There is presently a need for an optical data storage system with focus and tracking error correction suitable for use with multilayer data storage media, including bulk media in which data are recorded throughout the volume thereof.

SUMMARY OF THE INVENTION

The present invention comprises a focusing and tracking error correction system for multilayer optical storage media, and particularly for optical media having a format hologram recorded therein, and with data recorded in the medium as localized alterations in the format hologram at data storage locations. Data storage media of this type are disclosed in pending U.S. patent application Ser. No. 09/016,382, filed on Jan. 30, 1998, to inventor Hesselink et al., and entitled "Optical Data Storage By Selective Localized Alteration of a Format Hologram and/or Retrieval by Selective Alteration of a Holographic Storage Medium" and U.S. patent application Ser. No. 09/229,457 filed on Jan. 12, 1999, in the name of inventors Daiber et. al., entitled "Volumetric Track Definition for Data Storage Media Used to Record Data by Selective Alteration of a Format Hologram", the disclosures of which are incorporated herein by reference.

The present invention achieves a robust servo lock using a separate focusing and tracking system with a servo spot tracking a dedicated tracking or guide surface. The focus of the main read/write beam is tightly coupled to the servo spot, but may additionally be adjusted optically or electronically positioned at a fixed offset distance from the servo spot in both the focus and tracking directions. Focus and tracking offset distances are continually updated via error signals obtained from embedded servo bursts or marks within the recording medium.

In general terms, the invention comprises a read/write (R/W) beam focused on a data plane via a first lens, a servo or guide beam focused on a tracking plane in an optical medium via the objective lens and a second lens, a data detection system associated with the R/W beam, a servo beam detector system associated with the servo beam, a wide band tracking servo system interfaced with the objective lens and the servo beam detector, and a narrow band focusing servo system interfaced with the second lens and the data detector.

In operation, the servo beam focus spot follows the tracking layer of an optical medium, while the R/W focus spot follows embedded servo marks or bursts within a recording or data plane of the medium at a specific distance from the servo focus spot. The wide band servo tracking system defines a servo loop which, when closed, locks the R/W focus spot at a specific distance from the servo focus spot. The second lens is generally positioned so that the servo beam is divergent and focused on the tracking layer. Movement of the second lens results in movement of the servo focus spot away from the tracking layer. The second lens is servo-linked to the narrow band servo system, and undergoes corrective motion in response to focus and tracking error signals sent from the data detector to the narrow band servo system.

The focus and tracking error correction system is particularly useful for multilayer optical data storage media which include a recording layer, a wavelength specific absorbing buffer layer or layers, and a reflective or partially reflective tracking layer. In the recording layer, a format hologram is first recorded via interference of a signal beam and reference beam. An additional reflective layer may be included in the medium to facilitate recording of the format hologram. Servo marks are recorded in the recording layer of the medium by creating localized alterations or deletions in the format hologram. The servo marks are "embedded" within the data or recording layer. In a preferred embodiment, the embedded servo marks are recorded prior to data recording so that the servo marks can assist in data recording. The servo marks include servo focus bursts and servo tracking bursts to maintain the R/W focus beam in the correct data track and in the correct data plane during data writing and retrieval. The embedded servo marks preferably utilize vertically staggered focus burst pairs and horizontally staggered tracking burst pairs.

The present invention also comprises optical data storage media which are structured and configured for use with the focus and servo tracking system of the invention.

Various advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

FIG. 3A is a schematic cross-sectional view of a preferred embodiment multi-layer optical data storage medium in accordance with the present invention.

FIG. 3B is a schematic cross-sectional view of the multi-layer optical data storage medium of FIG. 3A showing dual media attached in a back-to-back arrangement to provide a dual-sided optical data storage medium.

FIG. 3C is a schematic cross-sectional view of the multi-layer optical data storage medium of FIG. 3A which illustrates schematically the recording of a format hologram within a read/write layer of the medium.

FIG. 3D is a schematic cross-sectional view of the multi-layer optical data storage medium of FIG. 3A which illustrates schematically the reading of data from the read/write layer of the medium.

FIG. 3E is a schematic cross-sectional view of the multi-layer optical data storage medium of FIG. 3A which illustrates schematically the interaction of a servo beam with a tracking layer within the medium.

FIG. 9A is a schematic illustration of an optical disk in accordance with the invention which illustrates the location of servo and focus tracking bursts.

FIG. 9B is a schematic top view of a preferred servo tracking burst and servo focus burst pattern in accordance with the present invention.

FIG. 9C is a schematic top view of a preferred servo tracking burst and servo focus burst pattern in accordance with the present invention.

FIG. 10 is a schematic side elevation view of a set of focus burst pairs and tracking burst pairs which illustrates the use of vertically staggered focus burst pairs.

DETAILED DESCRIPTION OF THE PREFERRED EMBODIMENTS

Referring more specifically to the drawings, for illustrative purposes the present invention is embodied in the apparatus, optical media and method shown generally in FIG. 1 through FIG. 16. It will be appreciated that the apparatus and optical media may vary as to configuration and as to details of the parts, and that the method may vary as to details and the order of the steps, without departing from the basic concepts as disclosed herein.

Figure 1:
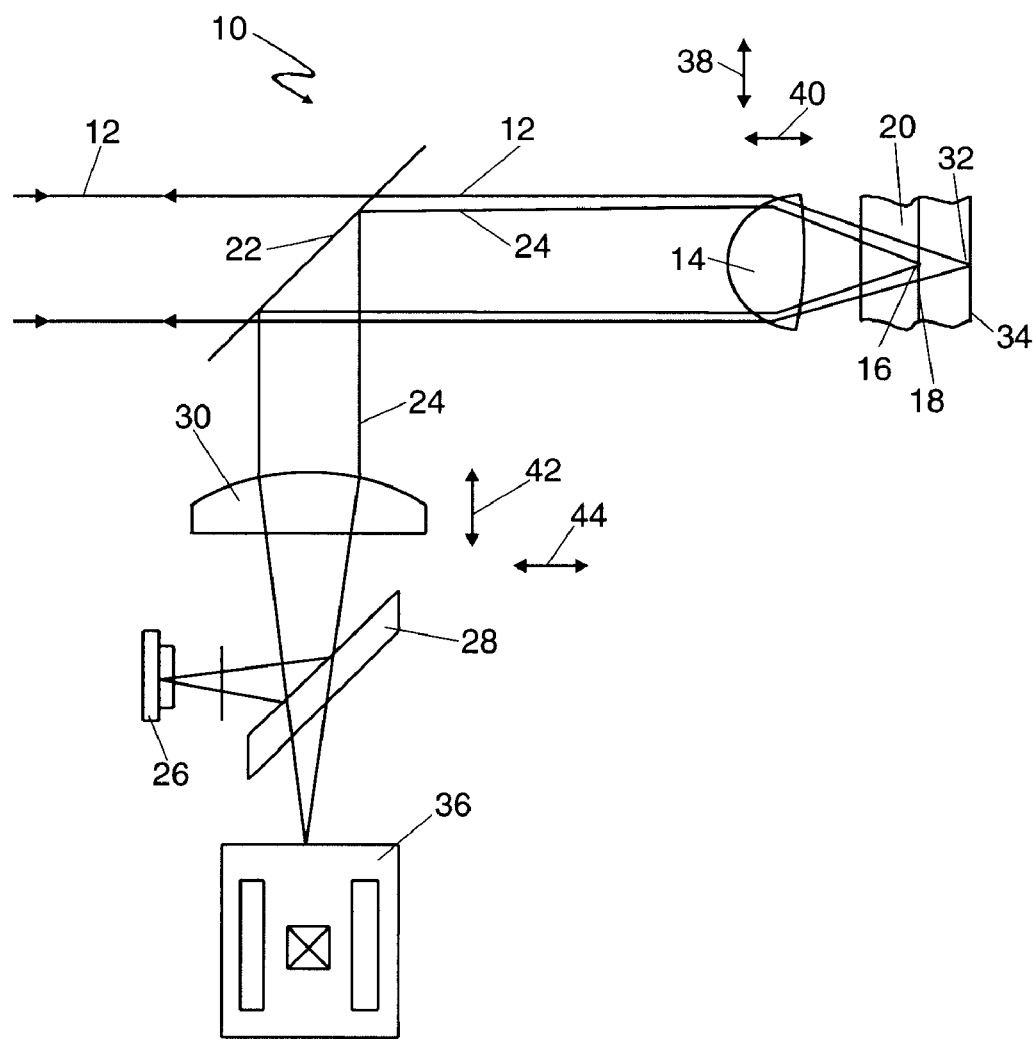
FIG. 1 is a schematic diagram which illustrates the operation of a focus and tracking error detection system of the present invention.

Referring first to FIG. 1, there is shown a focus and tracking error detection system 10 in accordance with the present invention. A read/write (R/W) beam 12 is shown as focused by an objective lens 14 to a R/W focus spot 16 on a recording or data plane 18 within an optical data storage medium 20. Data plane 18 includes both recorded data and embedded servo information therein, as related further below. Read/write beam 12 is generated by a conventional laser source (not shown). Medium 20 includes additional data planes parallel to data plane 18 which are not shown. R/W beam 12 is reflected from data plane 18 and returns through objective lens 14 to a detector (not shown) in the return path of beam 12. R/W beam 12 passes through a dichroic mirror 22 which selectively passes light at the wavelength of the R/W beam 12. R/W beam 12, in one preferred embodiment, is at a wavelength of 658 nanometers in accordance with preferred optical storage media of the invention as discussed below. The wavelength of R/W beam 12 may vary as required, however, for particular uses of the invention. In particular, the use of blue wavelength laser light for beam 12 is contemplated as blue emitting semiconductor lasers become commercially available.

A servo beam 24 is generated by a laser 26, and is reflected off partial mirror 28 through a lens 30. Servo beam 24 is directed by lens 30 to reflect off dichroic mirror 22 and pass through objective lens 14, which focuses servo beam 24 to a servo focus spot 32 on a servo or guide plane 34 within optical storage medium 20. Mirror 22 selectively reflects servo beam 24 while passing R/W beam 12, as noted above. Servo beam 24 in one preferred embodiment, is at a wavelength of 780 nanometers in accordance with preferred optical data storage media of the invention, but may be varied as necessary for different uses of the invention.

Servo plane or layer 34 preferably comprises a layer of thermoplastic or like material which can be stamped or embossed with a servo pattern. In this regard, tracking plane 34 includes a groove or track pattern (not shown) which provide continuous wide band tracking information, as described further below. Servo beam 24 is reflected by tracking plane 34 in medium 20, and returns through objective lens 14 to reflect off mirror 22, and pass through lens 30 to a servo detector 36. Servo detector 36 contains standard detection optics which are present in a conventional CD head. Lens 30 is shown positioned such that servo beam 24 is not collimated, but is diverging as it emanates from lens 30 and is focused at a position which is offset to the right of R/W focus spot 16.

Objective lens 14 and servo detector 36 are interfaced or otherwise associated by a conventional wideband servo system (not shown), such that objective lens 14 is servo-linked to detector 36. When the servo loop is closed, the servo focus spot 32 tracks the tracking layer 34, and will undergo focus offset corrections along focus offset axis 38, and tracking offset corrections along tracking offset axis 40 when servo focus spot 32 deviates from tracking plane 34 due to vibrations, disk aberrations or other causes. Lens 14 is translated along focus offset axis 38 and tracking offset axis by conventional precision micropositioning devices (not shown) associated with the servo system. During focus offset correction, objective lens 14 will move along focus offset axis 38 to maintain servo focus spot 32 on tracking layer 34. Movement of objective lens 14 also results in corresponding re-positioning of R/W focus spot 16 along the depth of medium 20, along focus offset axis 38, under the action of the servo system. Thus, the R/W focus spot 16 is servo-linked to the servo focus spot 32. If lens 30 moved along offset axis 42, servo focus spot 32 moves correspondingly along focus offset axis 38, and, via the servo link, R/W focus spot 16 moves along focus offset axis 38.

Figure 2:
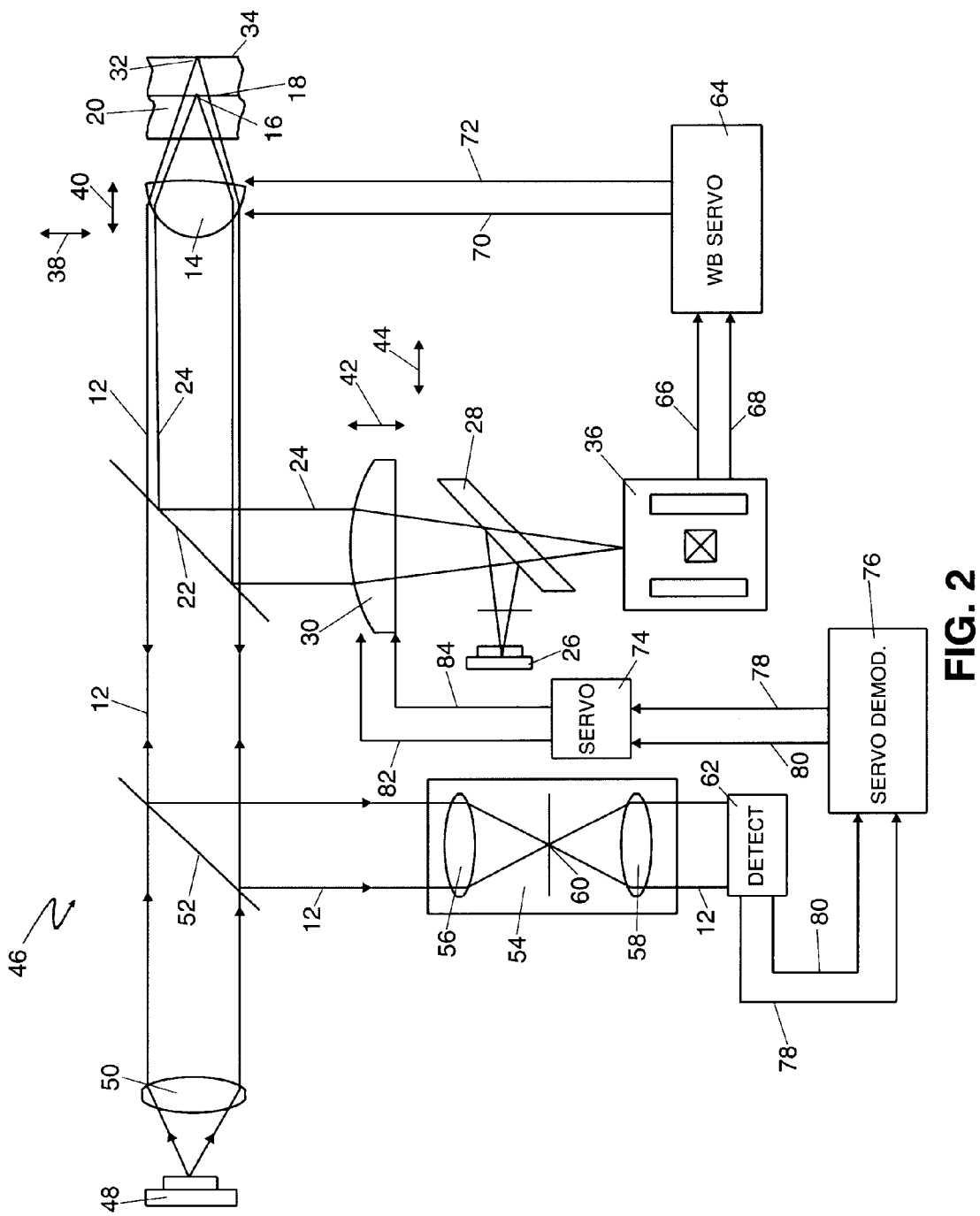
FIG. 2 is a schematic diagram of an optical data storage system in accordance with the present invention.

Referring also to FIG. 2, one preferred embodiment of a focus and tracking error correction system 46 in accordance with the invention is shown, wherein like reference numbers denote like parts. The system 46 shows a R/W laser source 48, the light from which is collimated by lens 50 to form R/W beam 12. R/W beam 12 is directed through a partial mirror 52, towards dichroic mirror 22 which selectively passes R/W beam 12. A partial mirror is 52 used for illustrative purposes. Skilled artisans will know how to use polarization optics to improve efficiency. As in system 10 above, the R/W beam 12 is then directed through objective lens 14 which focuses beam 12 to a R/W focus spot 16 within data plane 18 in medium 20. Light reflected from data plane 16 returns through lens 14 and dichroic mirror 22, and is reflected off partial mirror 52 and directed towards confocal pinhole detection optics 54. Detection optics 54 include a pair of objective lenses 56, 58 and a pinhole 60, which direct beam 12 to a data detector 62.

A wideband servo system 64 is operatively coupled to servo detector 36 and objective lens 14. Focus error signals 66 and tracking error signals 68 from detector 36 are communicated to wideband servo system 64, which communicates corresponding focus offset correction signals 70 and tracking offset correction signals 72 to actuators (not shown) associated with objective lens 14. Servo systems are well known in the art, and the details of servo system 64 are not disclosed in detail herein. Objective lens 14 is mechanically translated along focus offset axis 38 and tracking offset axis 40, via conventional precision microposition actuators (not shown) associated with servo system 64, according to respective focus offset correction signals 70 and tracking offset correction signals 72.

Any suitable focus error signal generator can be used in conjunction with detector 36 and servo system 64, such as the well known astigmatic method. An exemplary focus error signal generation system suitable for use with the invention is provided in U.S. patent application Ser. No. 09/229,140, entitled "FOCUS ERROR SIGNAL GENERATION USING CONFOCALLY FILTERED DETECTION", filed on Jan. 21, 1999 in the names of McCleod et al., the disclosure of which is incorporated herein by reference.

Likewise, any standard tracking error signal generating system, such as a conventional push-pull (CD-R) system, may be used with detector 36 and servo system 64. Suitable focus error signal and tracking error signal generating systems are disclosed in "Optical Recording: A Technical Overview" by Alan B. Marchant, Chapter 7, Addison-Wesley Publishing Co., 1990. Another preferred tracking error signal generation system is disclosed in U.S. patent application Ser. No. 09/595,433, entitled "TRACKING ERROR SIGNAL GENERATION USING CONFOCALLY FILTERED DETECTION", filed on Jun. 15, 2000 in the name of McDonald et al., the disclosure of which is incorporated herein by reference.

A narrowband offset servo system 74 is operatively coupled to collimating lens 30 and a servo demodulator 76. Servo demodulator 76 is operatively coupled to data detector 62. Embedded focus servo error signals 78 and embedded tracking servo error signals 80, which are associated with servo marks embedded within data plane 18 in medium 20, are detected by data detector 62, demodulated by servo demodulator 76, and communicated to servo system 74. Corresponding focus offset correction signals 82 and tracking offset correction signals 84 are communicated by servo system 74 to collimating lens 30. Lens 30 is mechanically translated along focus offset axis 42 and tracking offset axis 44, via conventional microposition actuators (not shown) associated with servo system 74, according to respective focus offset correction signals 82 and tracking offset correction signals 84, in order to maintain the optimum positioning of servo focus spot 32 on servo surface 34. Various types of focus and tracking error signal generating methods may be used with servo system 74 and detector 62, as noted above.

In operation, servo focus spot 32 tracks along tracking layer 34, while R/W focus spot 16 follows data tracks (not shown) within data plane 18. Medium 20 is generally in the form of an optical disk and undergoes rotation on a spindle assembly (not shown) during writing and readout. Recorded throughout data plane 18 are embedded servo marks (not shown) which will generally include servo focus bursts, servo tracking bursts, servo sync field information and servo Graycode information for various sectors and tracks of optical medium 20, as related further below. The servo bursts provide focus and tracking information with respect to the positioning of R/W focus spot 16. The main servo operation of the invention is provided by wideband servo system 64, according to servo information in tracking layer 34, with servo system 64 translating objective lens 14 accordingly. Narrowband servo system 74 makes relatively small tracking and focus offset corrections, according to embedded servo marks in data plane 18, by appropriate translation of lens 30.

Referring now to FIG. 3 through FIG. 8, various optical recording media in accordance with the invention are shown, which may be used for the medium 20 of FIG. 1 and FIG. 2. It should be readily understood that the layers and components of the media structures are not necessarily shown to scale, and in many places have been exaggerated in thickness for reason of clarity. The use of particular laser wavelengths with respect to the media of FIG. 3 through FIG. 8 is only exemplary, and the optical media of the invention may be configured for use with a variety of different wavelengths.

Referring to FIG. 3A, there is shown an optical data storage medium 86 in accordance with the present invention. Optical storage medium 86 includes a top or outer substrate 88, a read/write layer (R/W) 90, a buffer layer 92, a CD groove layer or servo plane 94, and a bottom or inner substrate, 96. Outer substrate 88 is preferably index matched to R/W layer 90 and is optically transparent to read/write, servoing and format hologram recording wavelengths. Inner and outer substrate layers 88, 96 may be about 0.6 mm thick, for example, and provide a protective outer coating for medium 86. R/W layer 90 preferably comprises a photopolymer or other photoactive material, and may be, for example, about sixty microns in thickness. Buffer layer 92 is preferably index matched to R/W layer 90, and may include wavelength specific absorbers which will vary depending upon the particular embodiment and use of the invention. Tracking or servo layer 94 may comprise a conventional embossed or stamped CD track or groove pattern which may be partially or wholly mirrored depending upon the particular embodiment of the invention.

Optical medium 86 is preferably addressed or illuminated by format hologram recording beams 100A, 100B, read/write beam(s) 102 and servo beam(s) 104, which enter medium 86 through outer substrate 88, as illustrated in FIG. 3C through FIG. 3E. Beam 100B is a diffraction of beam 100A off of reflective servo layer 94. FIG. 3B shows a dual sided optical medium 98 wherein the inner substrates 96 are adhered back to back by a glue layer 105. In the particular embodiment shown in FIGS. 3C–3E, the format hologram recording beams 100A, 100B In R/W layer 90, a format hologram is first recorded, preferably by interference of signal and reference beams 100A, 100B within R/W layer 90. Format hologram recording in this embodiment is carried out with green laser light at 532 nm, which may be provided by frequency doubled NdYAG laser output. As shown in FIG. 3C, the reflective tracking layer 94 is utilized for format hologram recording by generating beam 100B from the diffraction of beam 100A off layer 94. R/W layer 90 comprises a photopolymer which undergoes polymerization at the light fringes of the interference pattern of beams 100A, 100B, and in which binder material phase separates to migrate to the dark fringes of the interference pattern. The binder and polymerized photopolymer have different refractive indices and the polymerization results in the recording of the format hologram as variations in refractive index according to the fringe pattern of the format hologram.

Following formation of the format hologram in R/W layer 90, data is subsequently recorded in R/W layer 90 via write beam 102, which causes further polymerization in the photopolymer at selected data storage locations to alter or delete the format hologram at the data storage locations. Data can then be detected, for example, by different reflectivity at data storage locations depending upon whether or not the format hologram has been altered at the data storage locations. The same light beam or source may be used for both reading and writing data. In this regard, R/W beam 12 in FIG. 2 may comprise write beam 102 in FIG. 3D, and servo beam 24 in FIG. 2 may comprise servo beam 104 in FIG. 3E. Servo beam 104 will track servo layer 94 during writing and readout of medium 86.

Figure 3F:
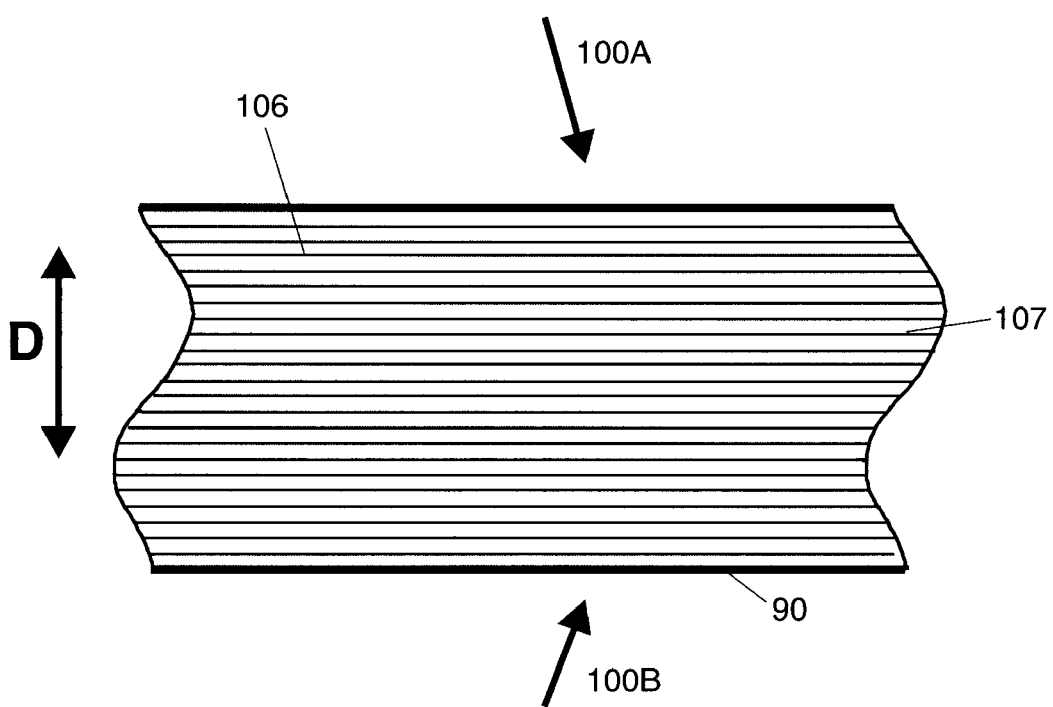
FIG. 3F is a schematic cross-sectional view of the read-write layer of the medium of FIG. 3A illustrating the recording of a format hologram therein.
Figure 3G:
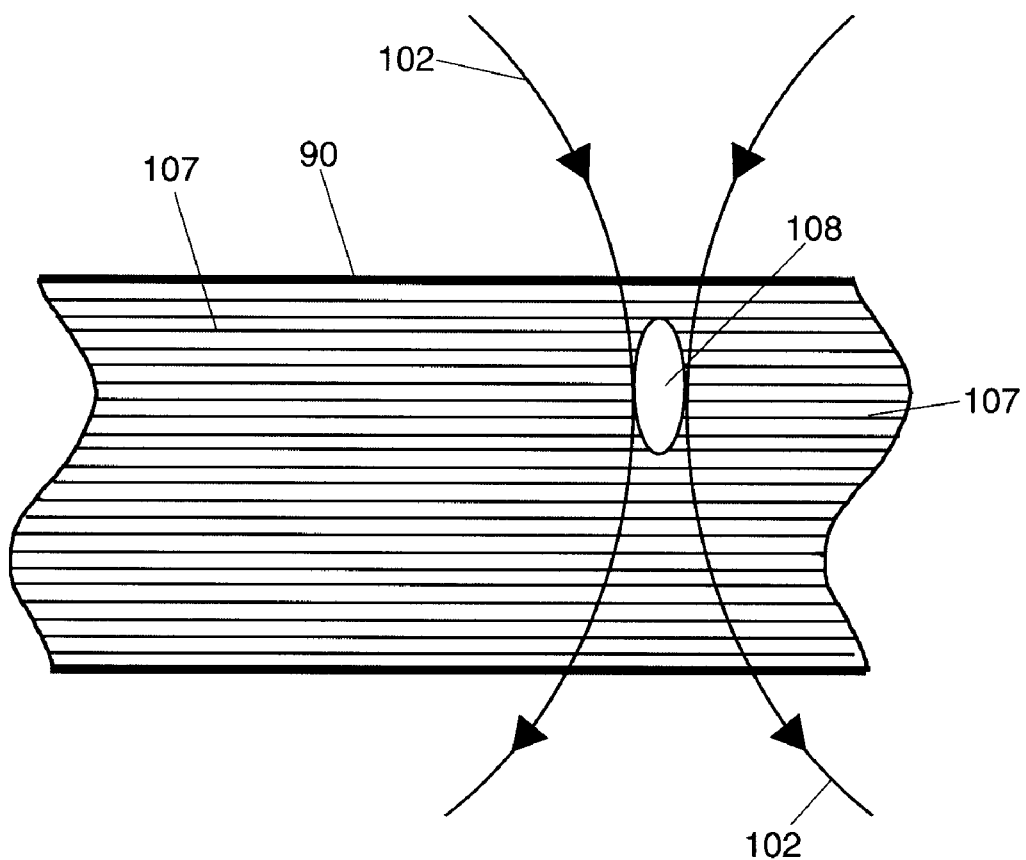
FIG. 3G is a schematic cross-sectional view of the read-write layer of FIG. 3F showing the recording of data by alteration of the format hologram.

The recording of the format hologram and subsequent recording of data by alteration thereof will be more fully understood by reference to FIG. 3F and FIG. 3G. In FIG. 3F, the read/write layer 90 is shown to include a format hologram 106 having a periodic, spatially-modulated refractive index that varies along a single depth axis D of layer 90, defining a plurality of reflective Bragg fringes 107. The spacings of fringes 107 are exaggerated for clarity, and are not shown to scale. The periodic structure of format grating 106 layer 90 defines a first Bragg reflection condition such that the layer 90 is particularly reflective to light of certain frequencies incident upon layer 90 at specific angles respectively, and is relatively transparent to light from other sources. Specifically, if the spacing between Bragg fringes is d, the index of refraction is n and the light is incident upon layer 90 at an angle of $\theta$ with wavelength $\lambda$, then the Bragg reflection condition is that the quantity $2nd \sin \theta$ should be equal to $\lambda$: $\lambda = 2nd \sin \theta$, in which $\theta$ is the angle between the direction of propagation of a plane wave and a Bragg fringe within the medium. The Bragg reflection condition defines peak reflection. Generally, it is well known that substantial reflection will occur for a small range of wavelengths at a fixed angle, or a small range of angles at a fixed wavelength. In particular, the Bragg reflection condition depends on the spacing between consecutive fringes 107. For a reflection grating Bragg-matched for normal incidence, $\theta = \pi/2$, therefore $\lambda = 2nd$. "Optical fringe spacing" is defined as nd.

The recording of format grating 106 in layer 90 is carried out by exposing layer 90 to two coherent monochromatic light beams 100A, 100B. In the case of optical medium 86, beam 100B is generated by diffraction of beam 100A off servo layer 94. Alternatively, beams 100A, 100B can be derived by splitting of a single beam via conventional optics, or may be generated from different sources. The beams 100A, 100B are incident upon generally opposite sides of layer 90 at slightly oblique angles. An interference pattern of light and dark fringes 107 of a format hologram 106 is established that alters the refractive index in the of the photoactive material of layer 90 where beams 100A, 100B constructively interfere. Hologram 106 is stored in layer 90 via photopolymerization of photoactive material occurs at the light fringes 107 due to phase-separation induced refractive index change or other optically detectable change. The spacing between these fringes 107 will generally be on the order of half the wavelength of beams 100A, 100B. The exposed hologram 106 may be fixed or cured to render the photoactive material of layer 90 insensitive to further holographic exposure at the wavelength used to record the format hologram.

In FIG. 3G, data is shown as recorded by locally altering the format hologram 106 at a data storage location 108 using a focused write beam 102. The localized alteration at location 108 is formed by disrupting, deleting, erasing, enhancing, varying, or otherwise altering format hologram 106 in layer 90 at a selected data storage location 23. Read/write layer 90 will generally include a plurality of additional data storage locations which are similarly altered. The data storage locations 108 may be stored in multiple data layers or planes (not shown) within read/write layer 90. In other embodiments, multiple format holograms 107 may be stored at different depths within read/write layer 90 to define multiple data layers therein. 22.

Additional methods for format hologram recording are described in co-pending U.S. patent application Ser. No. 09/016,382, "Optical Storage by Selective Localized Alteration of a Format Hologram and/or Retrieval by Selective Alteration of a Holographic Storage Medium" to Hesselink et al., filed Jan. 30, 1998, and" and U.S. patent application Ser. No. 09/229,457 filed on Jan. 12, 1999, in the name of inventors Daiber et. al., entitled "Volumetric Track Definition for Data Storage Media Used to Record Data by Selective Alteration of a Format Hologram", the disclosures of which are incorporated herein by reference. The recording of the format hologram 106 in layer 90 of optical medium 86 may be carried out externally from optical data storage system 46 of FIG. 2 under factory conditions, after which optical medium 86 may be transferred to system 46 for data writing in the manner described above.

Various photopolymer and photoactive materials are suitable for R/W layer 90 for recording a format hologram and then recording data as localized alterations in the format hologram at selected data storage locations. The photopolymer used as the first photoactive material of the invention is preferably a photopolymer such as those disclosed in U.S. Pat. No. 5,759,721, issued Jun. 2, 1998 entitled "Holographic Medium and Process for Use Thereof" by inventors Dhal et.al., "Holographic Recording Properties in Thick Films of ULSH-500 Photopolymer", D. A. Waldman et al., SPIE Vol. 3291, pp.89–103 (1998), in "Determination of Low Transverse Shrinkage in Slant Fringe Grating of a Cationic Ring-Opening Volume Hologram recording Material," Waldman et al., SPIE Vol. 3010, pp. 354–372 (1997), "Cationic Ring-Opening Photopolymerization Methods for Volume Hologram Recording, D. A. Waldman et al., SPIE Vol. 2689, pp. 127–141 (1996), "Holographic Medium and Process," by Dhal et al., WO 97/44714 (1997), "Holographic Medium and Process," by Dhal et al., WO 97/13183 (1997), and "Holographic Medium and Process," by Dhal et al., WO 99/26112 (1999), the disclosures of which are incorporated herein by reference. Photopolymers of this type include generally one or more cationic ring opening monomers, a sensitizer, a photoacid generator (PAG), and an active binder. Wavelength specific sensitizers may be included in the photopolymer for format hologram recording and data writing.

Additional examples of preferred photopolymer compositions are also described in U.S. patent application Ser. No. 09/364,552, entitled "METHOD AND APPARATUS FOR OPTICAL DATA STORAGE AND/OR RETRIEVAL BY SELECTIVE ALTERATION OF A HOLOGRAPHIC STORAGE MEDIUM", filed in the names of Lipson et al. on Jul. 29, 1999, U.S. patent application Ser. No. 09/364,324, entitled "OPTICAL STORAGE MEDIA AND METHOD FOR OPTICAL DATA STORAGE VIA LOCAL CHANGES IN REFLECTIVITY OF A FORMAT GRATING", filed in the names of Lipson et al. on Jul. 29, 1999, U.S. patent application Ser. No. 09/364,323, entitled "OPTICAL STORAGE MEDIA AND METHOD FOR OPTICAL DATA STORAGE VIA LOCAL CHANGES IN REFLECTIVITY OF A FORMAT GRATING", filed in the names of Sochava et al. on Jul. 29, 1999, and U.S. Provisional Patent Application Ser. No. 60/146,519, entitled "OPTICAL DATA STORAGE SYSTEM AND METHOD", filed on Jul. 30, 1999 in the names of Hesselink et al., the disclosures of which are incorporated herein by reference.

Figure 4A:
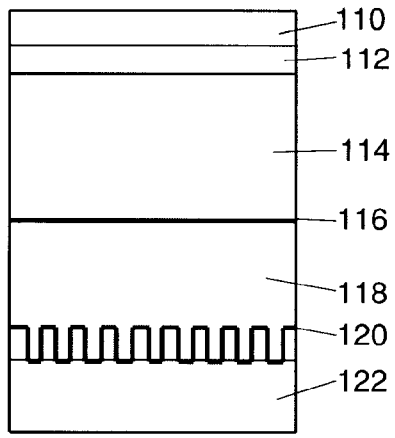
FIG. 4A is a schematic cross-sectional view of an alternative preferred embodiment optical data storage medium in accordance with the present invention.
Figure 4B:
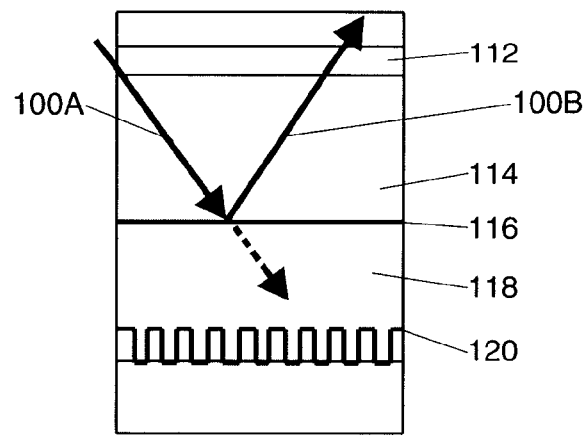
FIG. 4B is a schematic cross-sectional view of the multi-layer optical data storage medium of FIG. 4A which illustrates schematically the recording of a format hologram within the read/write layer of the medium.
Figure 4C:
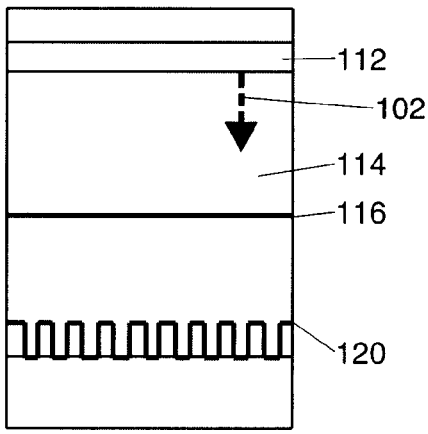
FIG. 4C is a schematic cross-sectional view of the multi-layer optical data storage medium of FIG. 4A which illustrates schematically the absorption of the read beam by an absorbing layer in the medium.
Figure 4D:
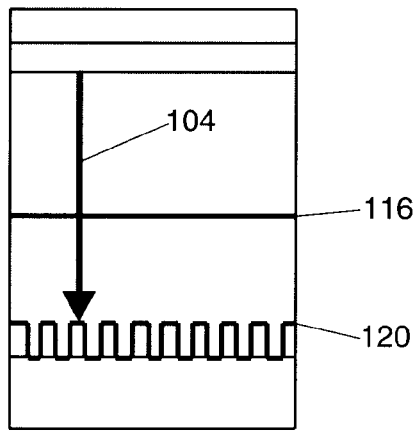
FIG. 4D is a schematic cross-sectional view of the multi-layer optical data storage medium of FIG. 4A which illustrates schematically the interaction of a servo beam with a tracking layer within the medium.

Referring next to FIG. 4A through FIG. 4D, there is shown an alliterative embodiment optical recording medium 109 in accordance with the present invention. Medium 109 includes an outer substrate 110, a R/W material layer 112, a selectively absorbing red-notch absorber layer 114, a 70% reflective layer 116, a selectively absorbing, IR-pass, green/red or green absorber layer 118, a reflective CD servo plane or layer 120, and an inner substrate 122. Red-absorber layer 114 is index matched to R/W layer 112, and is preferably transmissive to hologram recording beams 100A, 100B at 532 nm as shown in FIG. 4B, and transmissive to servo beam 104 at 780 nm as shown in FIG. 4D, but absorbing to R/W beam 102 light at 658 nm, as shown in FIG. 4C. IR pass layer 118 is transmissive to servo beam light at 780 nm and absorbs green and red light associated with format hologram recording beams 100A, 100B and R/W beam 102.

FIG. 4B illustrates format hologram recording by reflection of a format hologram recording beam 100A off the 70% reflective layer 116. The interference of incident beam 100A and reflected beam 100B provides the format hologram in the manner described above. Unreflected green light from incident beam 100A is absorbed in layer 118 as shown in FIG. 4B. FIG. 4C illustrates absorption of red light from R/W beam 102 in layer 112. FIG. 4D illustrates that medium 109 is generally transparent to 780 nm light of servo beam 104. The medium 109 avoids potential unwanted diffraction or reflection of format hologram recording beam 100A off the grooves of recording layer 120 by providing a separate partial reflective layer 116, as well as by providing for absorption of green light from beam 100A in layer 118. Unwanted reflection of write beam 102 from partially reflective layer 116 is avoided by the absorption of write beam 102 in layer 114. Once again it should be noted that the particular wavelengths used are merely exemplary and may be varied. The use of wavelength selective absorbing and transmitting layers for optical media at various wavelengths is well known in the art and is not described in detail herein.

FIG. 5A through FIG. 5D show yet another preferred optical storage medium 124 in accordance with the invention. Medium 124 includes an outer substrate 126, a read/write layer 128, a green pass/red absorber layer 130 index matched to R/W layer 128, a reflective servo layer 132, and an inner substrate 134. Layer 130 is selectively transmissive to green light for hologram recording via incident and reflected beams 100A, 100B, and to infrared light at the servo beam 104 wavelength, but is selectively absorbing to red light at the R/W beam 102 wavelength.

Figure 5A:
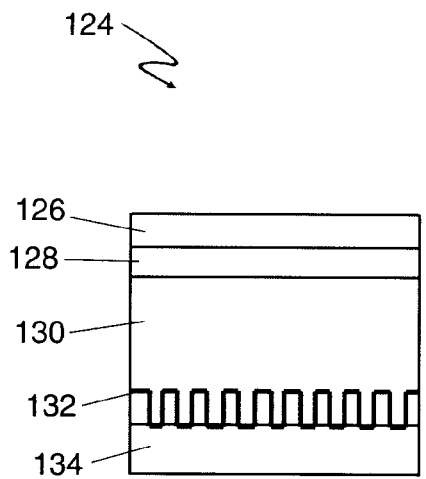
FIG. 5A is a schematic cross-sectional view of yet another alternative preferred embodiment optical data storage medium in accordance with the present invention.
Figure 5B:
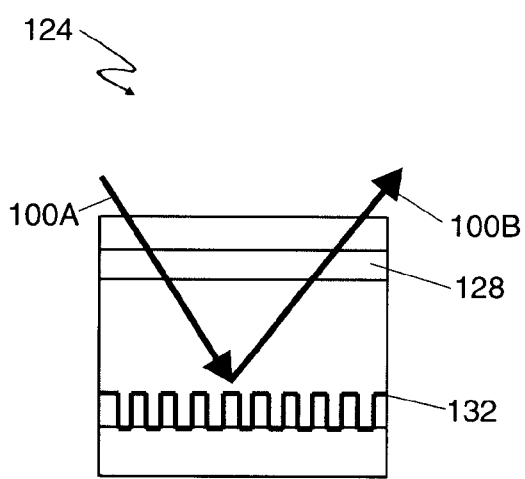
FIG. 5B is a schematic cross-sectional view of the multi-layer optical data storage medium of FIG. 5A which illustrates schematically the recording of a format hologram within the read/write layer of the medium.
Figure 5C:
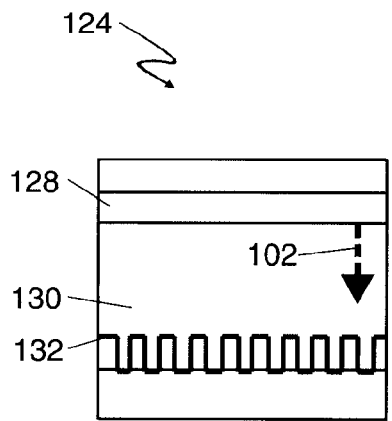
FIG. 5C is a schematic cross-sectional view of the multi-layer optical data storage medium of FIG. 2A which illustrates schematically the absorption of the read beam by an absorbing layer in the medium.
Figure 5D:
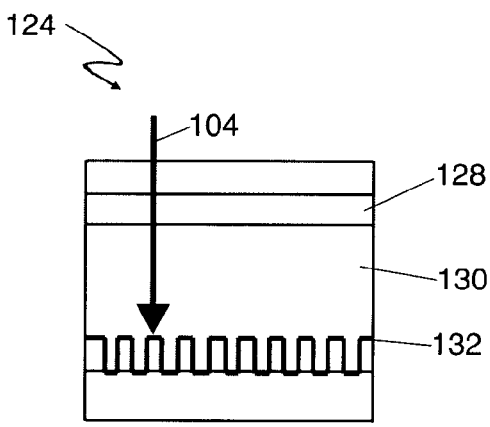
FIG. 5D is a schematic cross-sectional view of the multi-layer optical data storage medium of FIG. 5A which illustrates schematically the interaction of a servo beam with a tracking layer within the medium.

FIG. 5B illustrates format hologram recording by reflection or diffraction of a format hologram recording beam 100A off reflective tracking layer 132. The format hologram is formed as the interference pattern resulting from incident and reflected beams 100A, 100B, as related above. FIG. 5C illustrates absorption of red light from R/W beam 102 in layer 130. FIG. 5D illustrates that medium 124 is transparent to 780 nm light of servo beam 104. In this manner, reflection of R/W beam 102 off tracking layer 132, which might otherwise interfere with data writing and readout, is avoided.

Figure 6A:
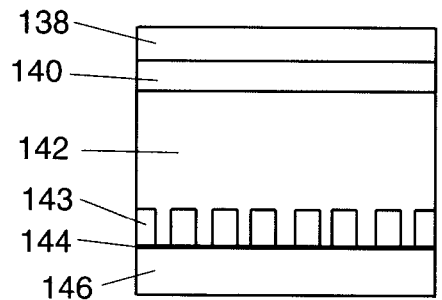
FIG. 6A is a schematic cross-sectional view of still another alternative preferred embodiment optical data storage medium in accordance with the present invention.
Figure 6B:
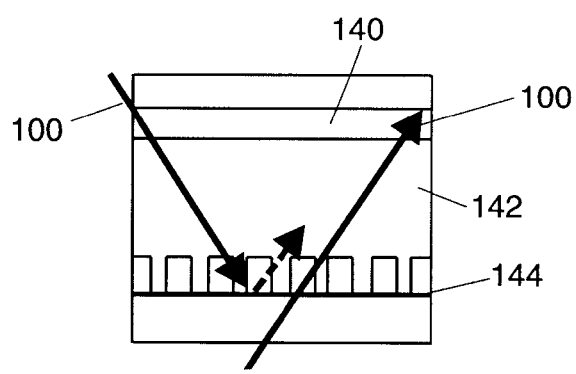
FIG. 6B is a schematic cross-sectional view of the multi-layer optical data storage medium of FIG. 6A which illustrates schematically the recording of a format hologram within the read/write layer of the medium.
Figure 6C:
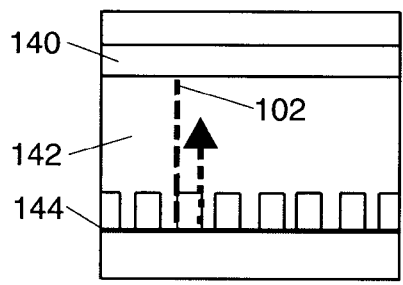
FIG. 6C is a schematic cross-sectional view of the multi-layer optical data storage medium of FIG. 2A which illustrates schematically the absorption of the read beam by an absorbing layer in the medium.
Figure 6D:
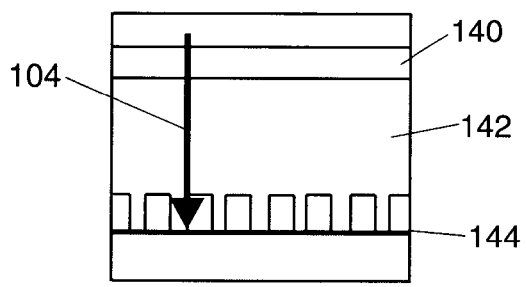
FIG. 6D is a schematic cross-sectional view of the multi-layer optical data storage medium of FIG. 6A which illustrates schematically the interaction of a servo beam with a tracking layer within the medium.

Yet another preferred embodiment of an optical storage medium 136 is shown in FIG. 6A through FIG. 6D. Medium 136 includes an outer substrate 138, a R/W layer 140, an IR pass, red absorbing and partial green absorbing layer 142 index-matched to R/W layer 140, a 4% a reflective groove structure 143 on servo plane 144, and a bottom substrate 146. Servo layer 144 is a groove structure comprising a strong IR absorber (780 nm) which passes green (532) light. Layer 142 partially transmits green light and fully transmits infrared light at the format hologram recording and servo wavelengths respectively, but is absorbing to red light at the R/W wavelength. FIG. 6B illustrates format hologram recording via dual format hologram recording beams 100A, 100B entering medium 136 from opposite sides of medium 136, with beam 100B passing through partially reflective groove structure 143 and servo plane 144 to interfere with beam 100A in R/W layer 140. Since layer 142 is partially absorbing to the green light, the diffraction of beam 100A off tracking layer 144 does not return to recording layer 140. FIG. 6C illustrates absorption of red light from R/W beam 102 in layer 142. FIG. 6D illustrates that medium 136 is generally transparent to 780 nm light of servo beam 104 up to the IR absorbing layer 143.

Figure 7A:
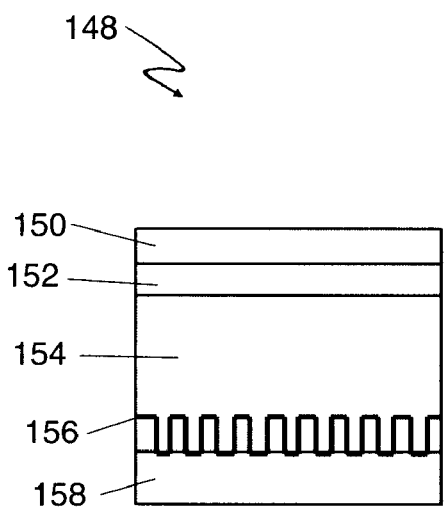
FIG. 7A is a schematic cross-sectional view of another alternative preferred embodiment optical data storage medium in accordance with the present invention.
Figure 7B:
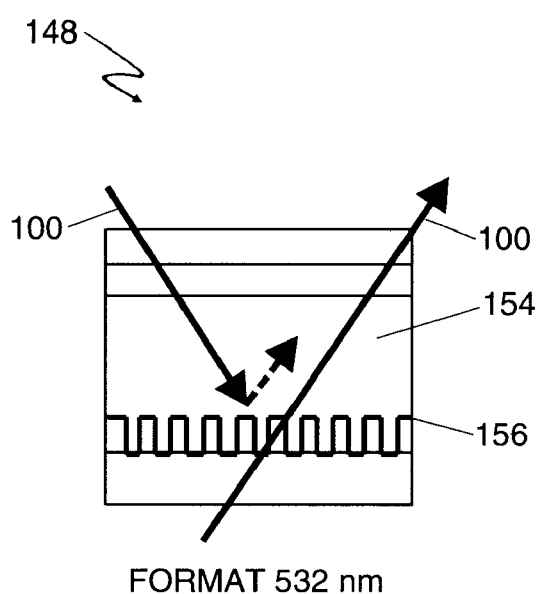
FIG. 7B is a schematic cross-sectional view of the multi-layer optical data storage medium of FIG. 7A which illustrates schematically the recording of a format hologram within the read/write layer of the medium.
Figure 7C:
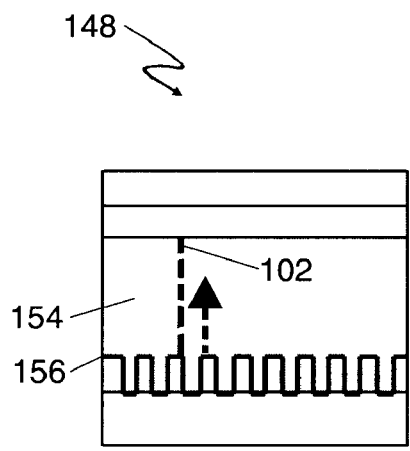
FIG. 7C is a schematic cross-sectional view of the multi-layer optical data storage medium of FIG. 2A which illustrates schematically the absorption of the read beam by an absorbing layer in the medium.
Figure 7D:
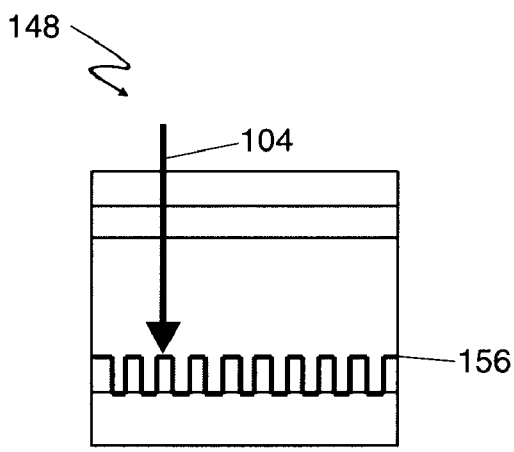
FIG. 7D is a schematic cross-sectional view of the multi-layer optical data storage medium of FIG. 7A which illustrates schematically the interaction of a servo beam with a tracking layer within the medium.

FIG. 7A through FIG. 7D show another embodiment of an optical storage medium 148 which includes an outer substrate 150, a R/W layer 152, an index matched IR pass/red absorbing and partial green absorbing layer 154, a 4% reflective tracking or groove layer 156, and an inner substrate 158. Layer 154 partially transmits green light and fully transmits infrared light at the format hologram recording and servo wavelengths respectively, but is absorbing to red light at the R/W wavelength. FIG. 7B illustrates format hologram recording via dual format hologram recording beams 100A, 100B entering medium 148 from opposite sides. The partial green absorption of layer 154 removes green light resulting from diffraction of beam 100A off groove layer 156. FIG. 7C illustrates absorption of red light from R/W beam 102 in layer 154. FIG. 7D illustrates that medium 136 is generally transparent to 780 nm light of servo beam 104.

Figure 8:
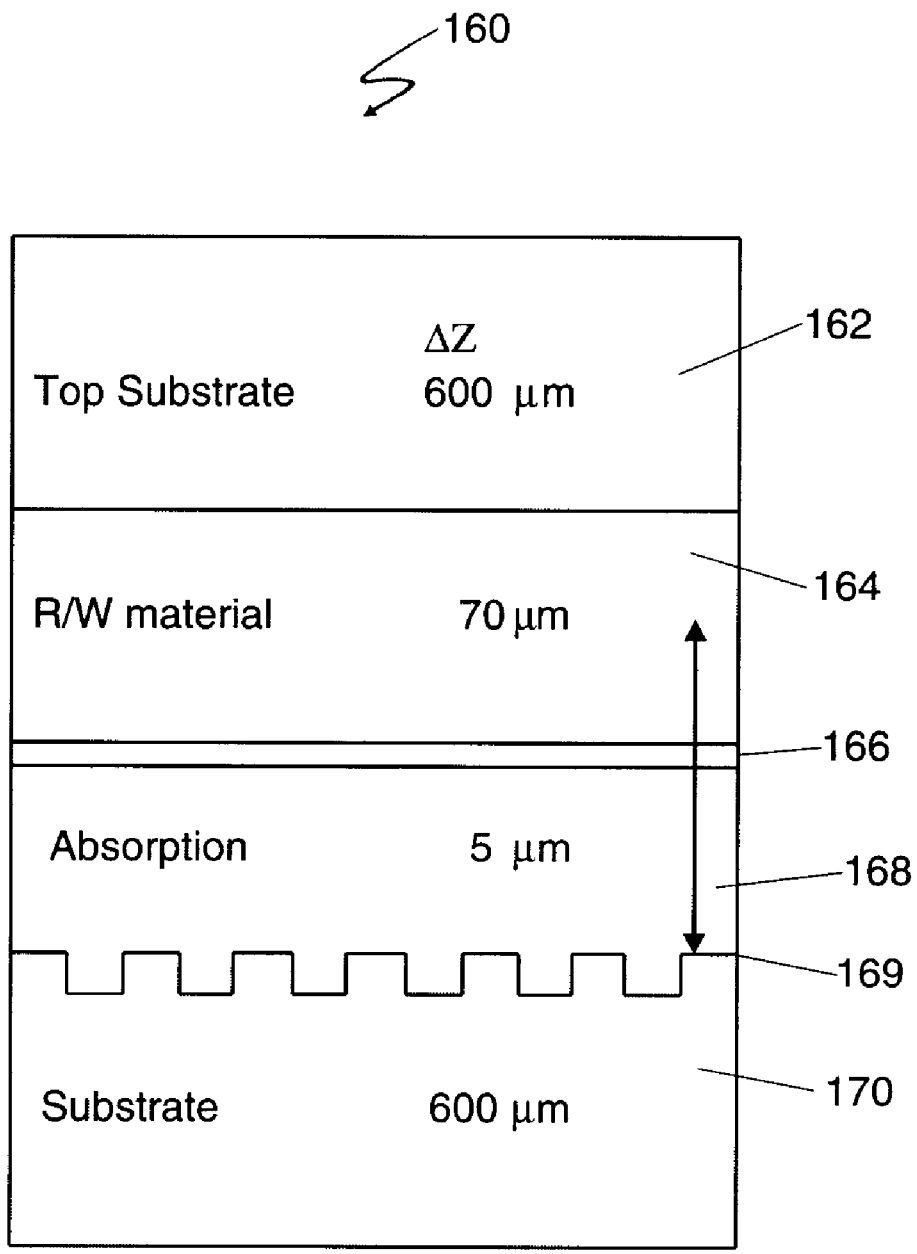
FIG. 8 is a schematic cross-sectional view of yet another alternative preferred embodiment optical data storage medium in accordance with the present invention.

Referring to FIG. 8, still another preferred embodiment optical data storage medium 160 in accordance with the invention is shown with some presently preferred layer thicknesses. Medium 160 includes a top substrate 162, a R/W layer 164, a UV cure adhesive layer 166, an IR pass/green-red absorber layer 168, a 4% reflective tracking layer 169, and a bottom substrate 170. Layer 168 is generally transmissive to the infrared servo beam (not shown), while absorbing to the green format hologram recording beams and red R/W beam (not shown). All layers are indexed matched, including the groove layer 169, as related above.

Referring now to FIGS. 9A and 9B, a preferred servo tracking burst and servo focus burst pattern in accordance with the invention is shown. FIG. 9A shows an optical medium in the form of a disk 168 having a plurality of sectors 170, each of which has at least one embedded servo mark 172. FIG. 9B shows servo focus bursts and servo tracking bursts associated with servo mark 172.

Referring now to FIG. 9A, a data layer 168 of an optical medium in accordance with the invention is shown configured in the manner of a conventional DVD disk. A plurality of such data layers would generally be present within the recording or R/W layer of the optical medium. Layer 168 is shown with a plurality of servo sectors 170 which are embedded within data layers (not shown) in the disk 168, as well as a dedicated servo layer (not shown) in disk 168. FIG. 9B is a schematic top view of a preferred servo tracking burst and servo focus burst pattern, and FIG. 9C provides a schematic top view of a preferred servo tracking burst and servo focus burst pattern in accordance with the present invention, as are present in data layer 168. Each burst or represents generally a local alteration at a data storage location in a data plane within a format hologram. Thus, the present invention provides for the recording or embedding of servo bursts within a data layer of the optical medium. The size of the focus and tracking bursts and the spacing of the layer centers are not shown to scale.

Figure 11:
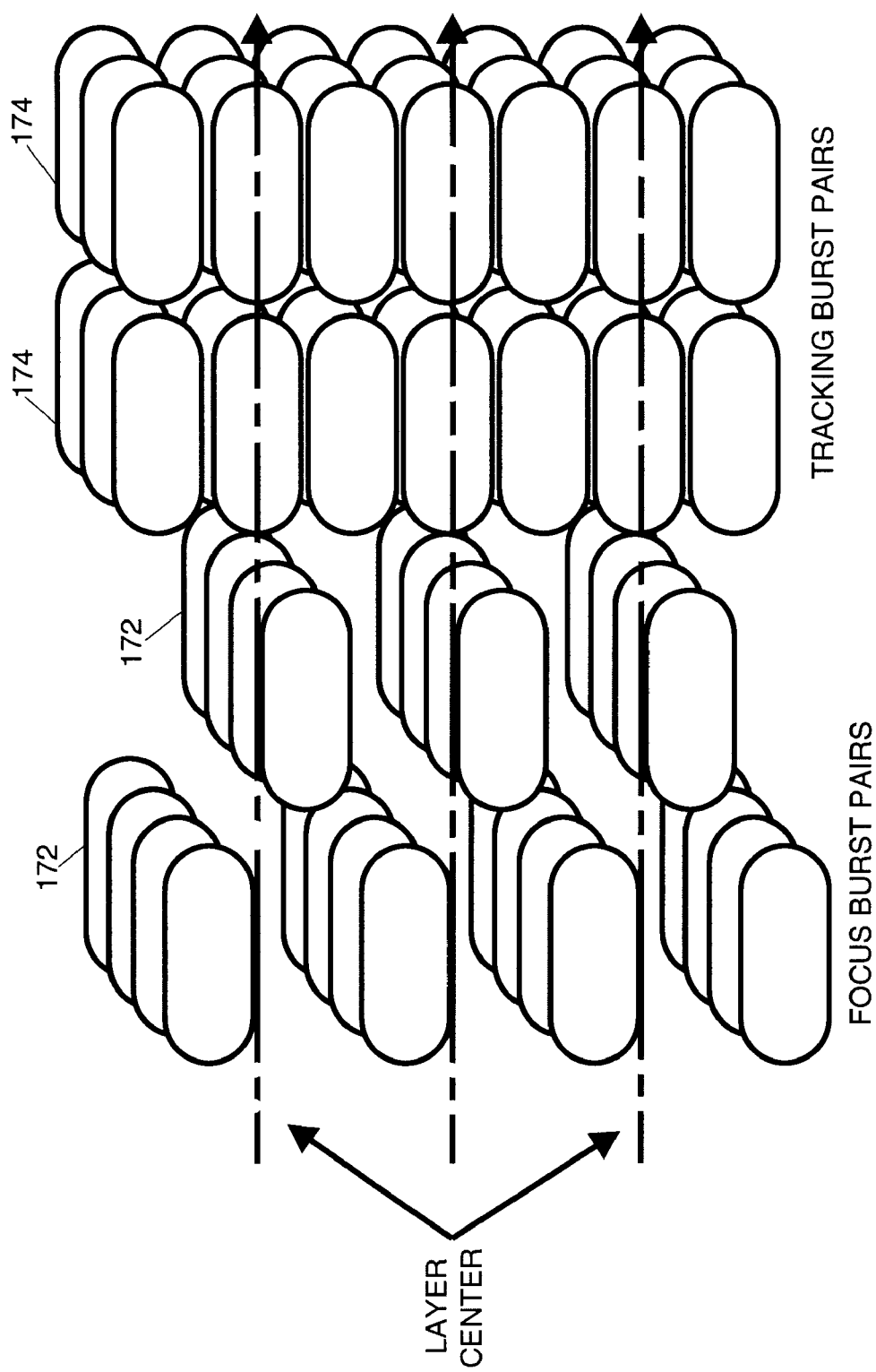
FIG. 11 is a schematic perspective view of the set of focus burst pairs and tracking burst pairs of FIG. 10.
Figure 12:
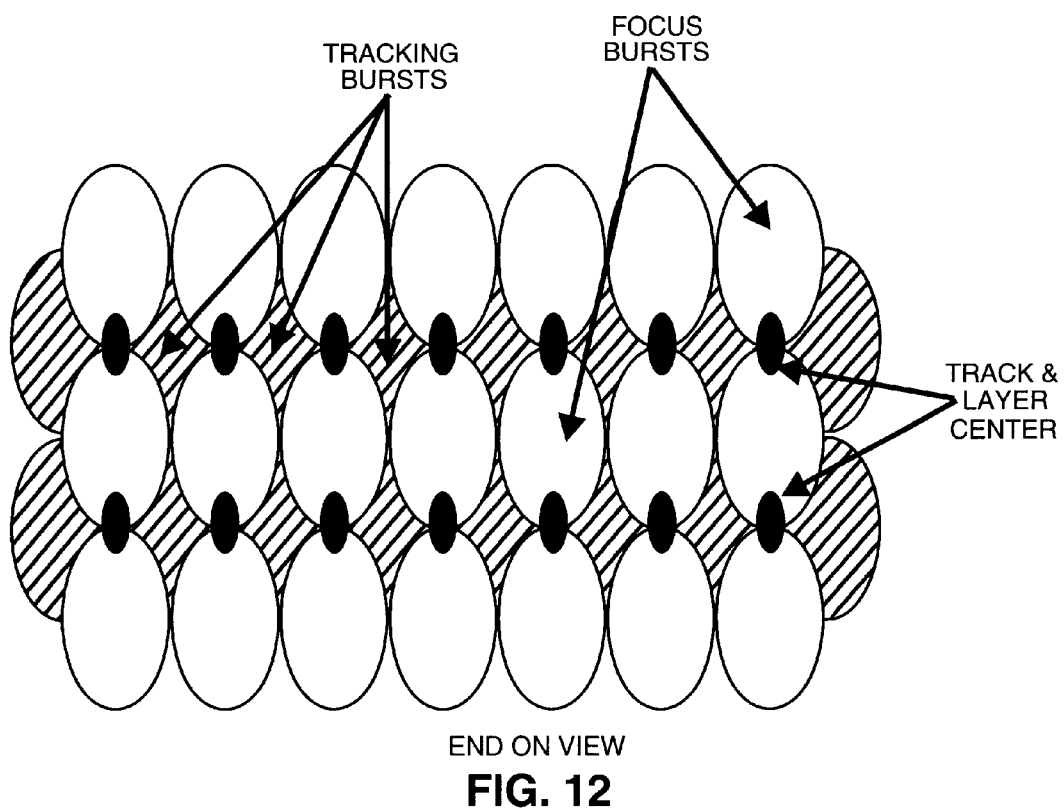
FIG. 12 is a schematic end view of the set of focus burst pairs and tracking burst pairs of FIG. 10.

FIG. 10 is a side elevation view of the servo focus bursts and servo tracking bursts of FIG. 9. The focus servo bursts 172 are arranged in servo burst pairs 173 wherein the bursts in each pair are vertically staggered or staggered in depth with respect to each other in order to provide for generation of a focus error signal. The user of servo focus and tracking bursts are well known in the art, and various arrangements of servo focus and tracking bursts may be used. One preferred arrangement for focus servo bursts 172 and tracking servo bursts 174 is a quadrature arrangement, which is described in detail in U.S. patent application Ser. No. 09/549,075, filed on Apr. 15, 200 in the name of Amble et al., the disclosure of which is incorporated herein by reference. FIG. 11 is a perspective view of the focus and tracking bursts of FIG. 10, and FIG. 12 provides an end view of the focus and tracking bursts of FIG. 10.

Figures 13A, 13B:
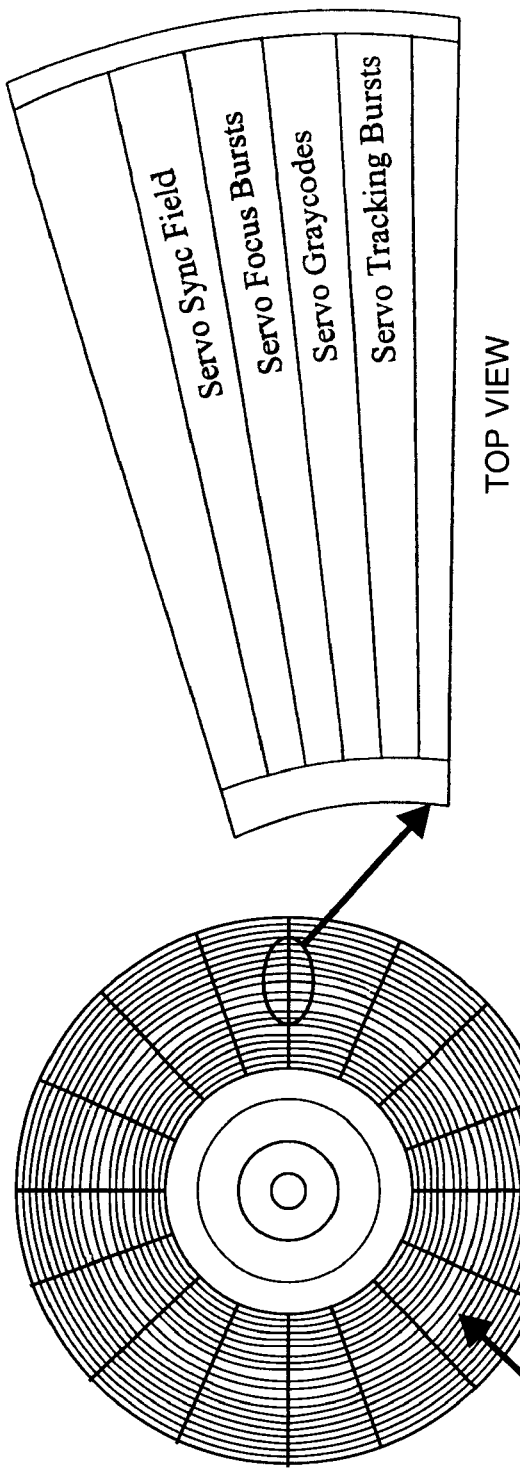
FIG. 13A and FIG. 13B are schematic views which illustrate the location of servo synch field, servo focus bursts, servo Graycodes and servo tracking bursts within a servo "wedge" in an optical disk in accordance with the present invention.
Figure 14:
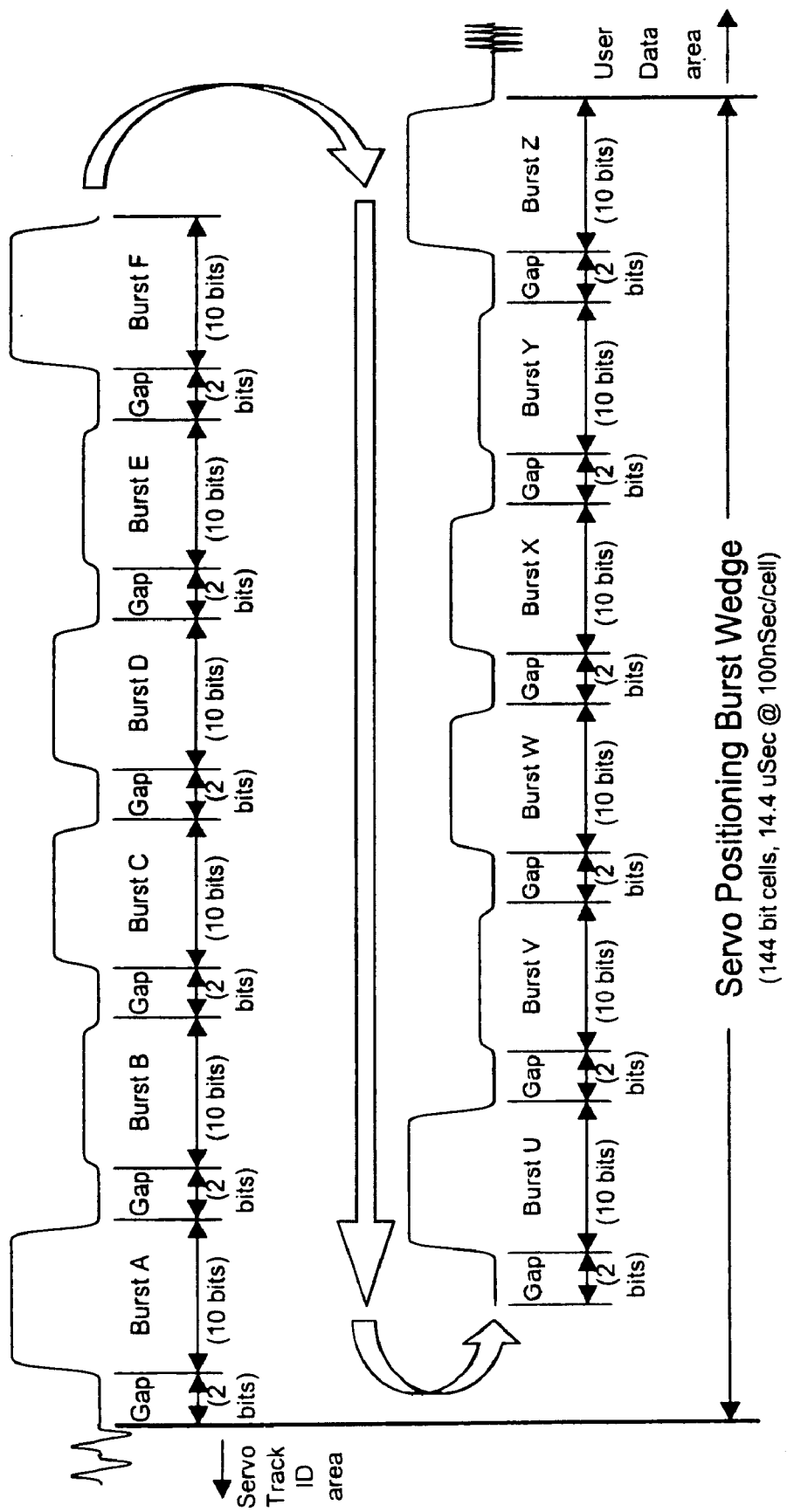
FIG. 14 is a schematic illustration of a readout pattern of a servo burst wedge in accordance with the present invention.
Figure 15:
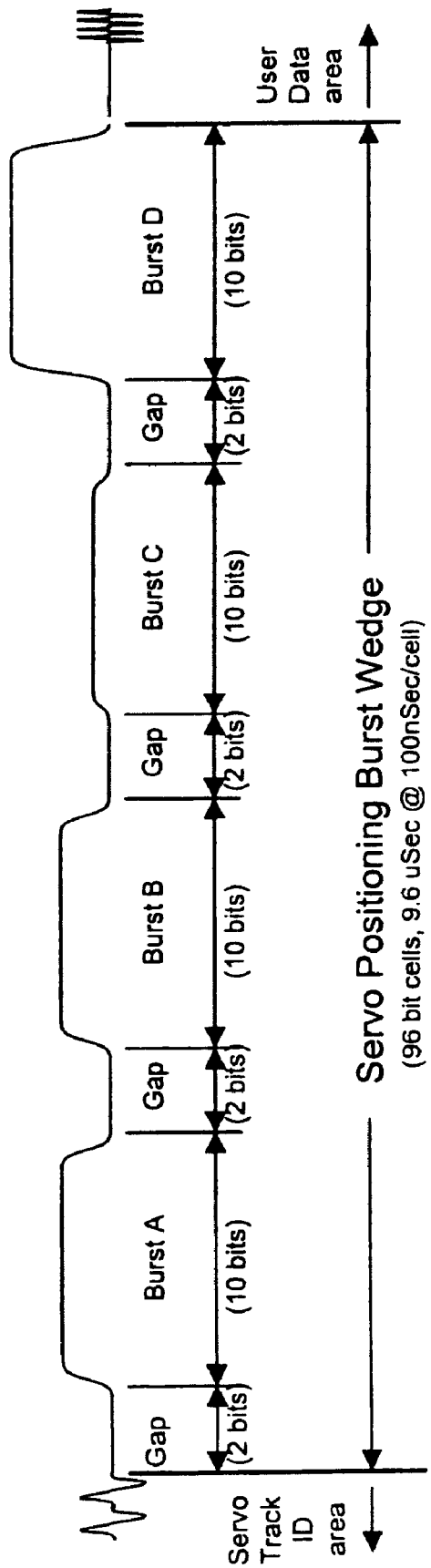
FIG. 15 is a schematic illustration of a readout pattern of an alternative embodiment servo burst wedge.
Figure 16:
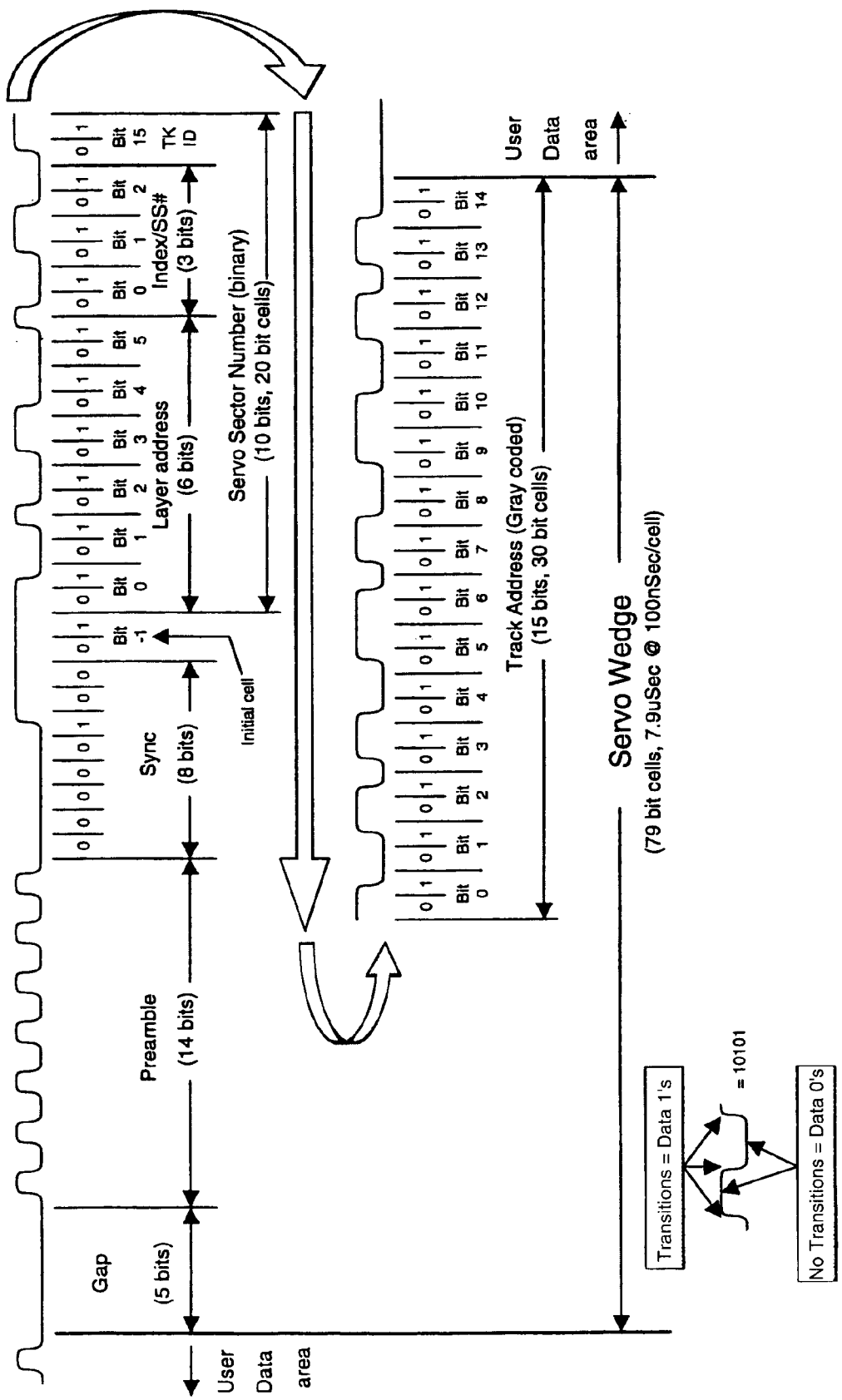
FIG. 16 is a schematic illustration of a readout pattern of a servo wedge in accordance with the present invention.

Referring to FIG. 13A, a dedicated servo layer 178 is shown configured in the manner of an optical disk. Dedicated servo layer 178 may comprise an embossed plastic disk or "EPD" which is part of the optical medium. Dedicated servo layer 178 includes a plurality of servo wedges 182 which, as shown in FIG. 13B, may comprise a servo sync field 182, a focus burst sector 184, a servo graycoding sector 186, and a tracking burst sector 188. Servo sync fields and graycoding are well known in the art and are not described herein. The preferred arrangement of bursts in burst sectors 184, 188 is the same as that noted above for data layer 168 in FIG. 9. FIG. 14 and FIG. 15 show generally the readout patterns, in voltage versus time, for preferred servo burst wedges in accordance with the present invention. FIG. 16 shows a readout pattern, in voltage versus time, for sync code, layer address and track address portions of a servo wedge in accordance with the present invention.

Accordingly, it will be seen that this invention provides an optical data storage system with focus and tracking error correction. Although the description above contains many specificities, these should not be construed as limiting the scope of the invention but as merely providing an illustration of the presently preferred embodiment of the invention.

What is claimed is:

1. An optical data storage system, comprising:
   (a) an optical medium including a servo plane and at least one data plane;
   (b) a first laser positioned to generate a servo laser beam and address said servo plane with a first, servo focus spot;
   (c) a second laser positioned to generate a read-write laser beam and address said data plane with a second, read-write focus spot;
   (d) a first servo system servo system associated with said first laser and configured to provide focus and tracking error correction according to servo information associated with said servo plane; and
   (e) a second servo system associated with said second laser and configured to provide focus and tracking error correction according to servo Information associated with said data plane.

2. The optical data storage system of claim 1, wherein said optical medium further comprises a read-write layer, said data plane located in said read-write layer.

3. The optical data storage system or claim 2, wherein said read-write layer includes a format hologram stored therein, said format hologram formed according to interference of a signal beam incident on a first side of said read-write layer, and a reference beam incident on a second side of said read-write layer.

4. The optical data storage system of claim 3, wherein said reference beam is a diffraction of said signal beam off said servo plane.

5. The optical data storage system of claim 3, wherein said servo laser beam has a first wavelength, said read-write beam has a second wavelength, and said signal beam and said reference beam have a third wavelength.

6. The optical data storage system of claim 5, wherein said optical medium further comprises:
   (a) a first selectively absorbing layer adjacent said read-write layer, said first selectively absorbing layer being substantially transparent to said first wavelength, substantially absorbing with respect to said second wavelength, and substantially transparent to said third wavelength;
   (b) a partially reflective layer adjacent said first absorbing layer, and
   (c) a second selectively absorbing layer adjacent said partially reflective layer, said second selectively absorbing layer substantially transparent to said first wavelength and substantially absorbing with respect to said third wavelength.

7. The optical data storage system of claim 6, wherein said reference beam is a reflection of said signal beam off said partially reflective layer.

8. The optical data storage system of claim 6, wherein said second selectively absorbing layer is substantially absorbing with respect to said second wavelength.

9. The optical data storage system of claim 5, wherein said optical medium further comprises a selectively absorbing layer adjacent said read-write layer, said selectively absorbing layer being substantially transparent to said first and third wavelengths and substantially absorbing with respect to said second wavelength.

10. The optical data storage system of claim 9, wherein said reference beam is a diffraction of said signal beam off said servo plane.

11. The optical data storage system of claim 6, wherein said servo plane is partially reflective.

12. The optical data storage system of claim 11, wherein said optical medium further comprises a selectively absorbing layer interposed between said read-write layer and said partially reflective servo plane, said selectively absorbing layer being substantially transparent to said first wavelength, partially transparent to said third wavelength, and substantially absorbing with respect to said second wavelength.

13. The optical data storage system of claim 3, wherein said read-write layer further comprises a plurality of localized alterations formed by altering said format hologram with said read-write laser beam, said localized alterations including stored data, said localized alterations including said servo information in said data plane.

14. The optical data storage system of claim 13, wherein said servo Information in said data plane comprises embedded servo focus bursts and embedded servo tracking bursts.

15. The optical data storage system of claim 14, wherein said servo plane comprises an embossed pattern including servo focus bursts and servo tracking bursts.

16. An optical data storage method, comprising:
   (a) providing an optical storage medium including a read-write layer and a servo plane, said servo plane including embossed servo information thereon;
   (b) recording a format hologram in said read-write layer by interference of a signal beam and a reference beam in said read-write layer;
   (c) addressing said servo plane with a servo laser beam and a servo focus spot;
   (d) addressing said data plane with a read-write laser and read-write focus spot;
   (e) locally altering said format hologram with a read-write beam to form a plurality of localized alterations, said localized alterations including stored data, said localized alterations Including embedded servo information;
   (f) providing focus and tracking error correction with a first servo system associated with said servo beam and servo information included in said servo plane; and
   providing focus and tracking error correction with a second servo system associated with said read-write beam and servo information embedded in said data plane.

17. An optical data storage method, comprising the steps of:
   providing an optical medium including a servo plane and at least one data plane:
   generating a servo laser beam with a first laser and addressing said servo plane with a first servo focus spot;
   generating a read-write laser beam with a second laser and addressing said data plane with a second read-write locus spot;
   providing, with a first servo system servo system associated with said first laser, focus and tracking error correction according to servo information associated with said servo plane; and
   providing, with a second servo system associated with said second laser, focus and tracking error correction according to servo information associated with said data plane.

18. The optical data storage method of claim 17, wherein said optical medium further comprises a read-write layer, said data plane located in said read-write layer.

19. The optical data storage method of claim 18, wherein said read-write layer includes a format hologram stored therein, said format hologram formed according to interference of a signal beam incident on a first side of said read-write layer, and a reference beam incident on a second side of said read-write layer.

* * * * *